United States Patent
Wriedt

[15] 3,685,799
[45] Aug. 22, 1972

[54] APPARATUS FOR LASHING-DOWN OF ARTICLES

[72] Inventor: Alfred Wriedt, Kroonhorst 130, Hamburg 53, Germany

[22] Filed: March 5, 1971

[21] Appl. No.: 121,340

[52] U.S. Cl. ............... 254/51, 105/368 T, 280/179 A
[51] Int. Cl. ........................... B60p 7/10, B66f 1/00
[58] Field of Search ..254/51; 105/368 T; 280/179 A; 248/161

[56] References Cited

UNITED STATES PATENTS 3,520,555   7/1970   Blair .................... 105/68 T X Primary Examiner—Othell M. Simpson
Attorney—Bosworth, Sessions, Herrstrom & Cain

[57] ABSTRACT

Apparatus for the lashing-down of articles being conveyed in a means of transport, and, in particular, of luggage being transported in aircraft.

7 Claims, 4 Drawing Figures

APPARATUS FOR LASHING-DOWN OF ARTICLES

BACKGROUND AND SUMMARY OF THE INVENTION

Although, in most cases, it is desirable to restrain articles during their journey in a means of transport, such restraint is frequently omitted and dangerous shifts of cargo are often accepted for reasons of laborsaving or of convenience. For those cases where a secure restraint of the cargo is essential, if its shifting is to be avoided, the tightening or loosening of the only lashing devices presently available is cumbersome and time-consuming. Also, it is often necessary to leave valuable storage space empty in order to allow the operators access to the lashing means. Further, when such devices are used, it is scarcely possible, if not impossible, to tighten them during the transport, although it is usually not even possible to ascertain if such tightening is necessary.

Especially in aircraft, but also in other means of transport, such as railroads, buses or the like, the transported articles, for instance, passengers' luggage, are often subjected to high acceleration and vibration even under normal conditions which can uncontrollably shift and damage such articles when these are not reliably secured. In aircraft, such shifts of cargo are particularly dangerous as they may cause deleterious changes in trim. Furthermore, the disorder of the articles caused by accidental cargo shifting is most undesirable when they are offloaded manually and unacceptable in cases of mechanical offloading.

It is the aim of the invention to provide a solution which makes it possible to lash down reliably articles to be conveyed in means of transport, to hold them securely during the journey, to loosen the lashing means and to hold them away from the articles so that these can be mechanically loaded or off-loaded, and, finally, to keep the lashing means in readiness for renewed use.

Apparatus of a kind described above and embodying the invention comprises, first, at least one tightening strap which is located above the articles and, at least partly, laterally to them, one of its ends being attached to the means of transport and its other end attached in a twist-tight manner to a drum which is mounted for rotation on the means of transport, and, second, at least one lifting strap, one of its ends being attached to an intermediate point on the tightening strap and the other end of the lifting strap being attached in a twist-tight manner to another drum which is mounted for rotation on the means of transport, with the turning of the two drums being controllable so that the coiling-up of the tightening strap is always accompanied by a sufficient uncoiling of the lifting strap and vice versa.

The term "twist-tight" as used herein means that the particular end of a strap is attached to the circumference of an associated drum in such a way that, when the drum turns in one direction or the other, the strap winds onto it or unwinds off it, respectively.

According to this arrangement, a lashing-down of the articles against their storage base is effected by means of a coiling of the tightening straps or belts onto the tightening drums, whereby the lifting strap or straps are correspondingly unwound from their associated drums. An unstrapping of the lashing is effected by the reverse procedure, i.e., the tightening straps are unwound from their drums and lifted off the articles by the lifting straps as the latter are wound up on their associated drums.

It is of particular advantage to design the arrangement in such a way that, when slackened, each tightening strap stretches generally along an angle; namely, horizontally above the articles and vertically on one side of the articles at a distance therefrom, while, on the opposite side, a supporting wall abuts on the articles. It is evident that, by such an arrangement and design, only a minimal strap length is used and that, when the tightening straps are slackened, the articles can be moved unhindered in or out beneath them.

In a preferred embodiment of the invention, two parallel shafts, which can be driven independently of each other, are provided and to each of them are attached coaxially at approximately equal distances an equal number of drums carrying tightening or lifting straps in a twist-tight manner, whereby all tightening drums are attached to one shaft and all lifting drums to the other.

A particularly advantageous feature of the invention is the provision of a clutch or ratchet mechanism between each tightening strap drum and its shaft so that, after a particular tightening strap has reached a taut state and its drum can, therefore, not turn any further in the tightening direction, a further turning of the shaft in the tightening direction is still possible. The mechanism also locks the drum against a reverse turn and, therefore, against a slackening of the tension of the tightening strap. This makes it possible to accomplish an equal tensioning of all tightening straps, even if these are not tightened up all at the same time for reason of differences in the articles beneath them.

It is further very advantageous to hold the tightening shaft during the lashing phase under a controllable tightening torque so that, if the tension of one or several tightening straps should diminish on account of a cargo shift, the tension is readjusted or, in other words, to let the motor for the particular shaft continue to run very slowly just overcoming the total resistive torque of the ratchets.

One can also connect neighboring tightening straps by a network of belt- or rope-like cross or diagonal webs which is particularly advantageous for smaller and irregularly shaped articles.

One can finally make the tightening straps or suitable parts thereof and/or the webs connecting them of highly elastic material, such as rubber, in order to equalize still better irregularities of the articles and to cushion jerks during the journey.

DETAILED DESCRIPTION OF PREFERRED AND MODIFIED EMBODIMENTS

Figure 1:
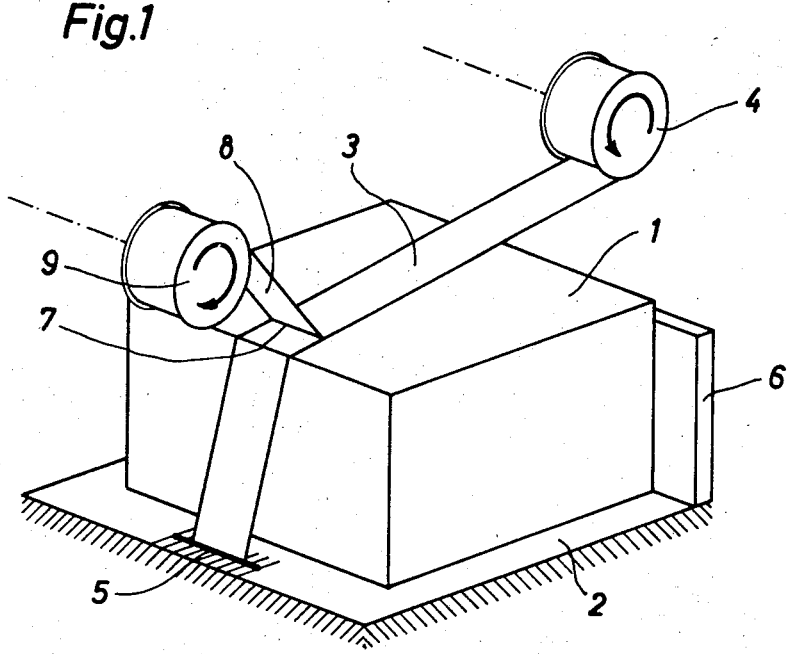
FIG. 1 is a representation in perspective of an apparatus embodying the invention shown in its lashed state and simplified to illustrate clearly the principle of the invention.
Figure 2:
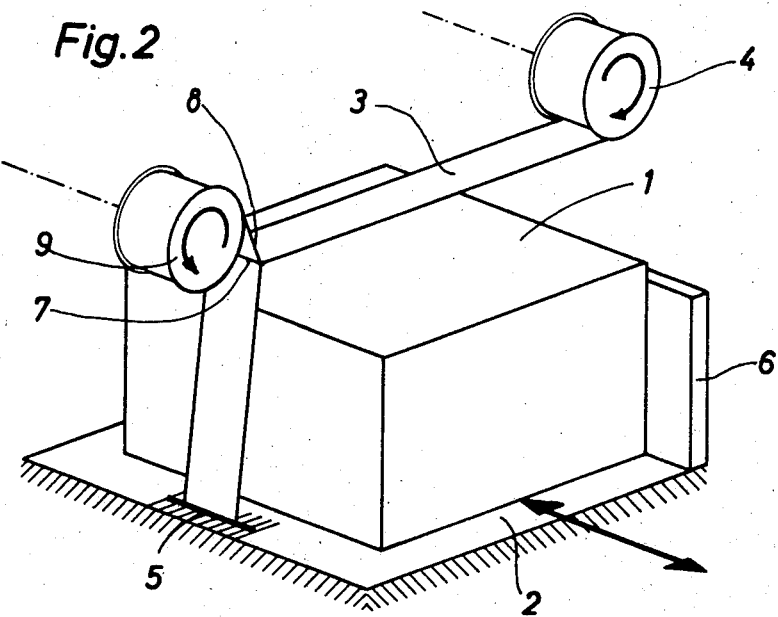
FIG. 2 shows the apparatus of FIG. 1 in its unlashed state.

In FIGS. 1 and 2, an article 1 rests on a storage base 2. Above article 1 and on one side of it stretches a flexible tightening strap 3. One end of tightening strap 3 is attached to a tightening drum 4 and the other end is attached at 5 to the storage base 2. Article 1 abuts on a support wall 6 which is located approximately opposite the vertical portion of tightening strap 3. A lifting strap 8 is attached to tightening strap 3 at a point 7 along its length which, in the unlashed state, as shown in FIG. 2, is located generally at the junction of the horizontal and the vertical portions of the tightening strap. The other end of lifting strap 8 is attached to a lifting drum 9 in a twist-tight manner.

It is evident from FIG. 1 that, upon turning of tightening drum 4 and lifting drum 9 in the direction of the arrows, tightening strap 3 is pulled over article 1 in such a way that the article is pressed tightly against storage floor 2 and supporting wall 6. The tension of tightening strap 3 can be maintained by maintaining a torque at tightening drum 4.

For release or unlashing, the two drums 4 and 9 are turned in the opposite way and in the direction of the arrows according to FIG. 2, whereupon tightening strap 3 is brought into a position essentially at an angle and completely free of article 1 so that it can be moved in either direction as indicated by the double arrow in FIG. 2.

Figure 3:
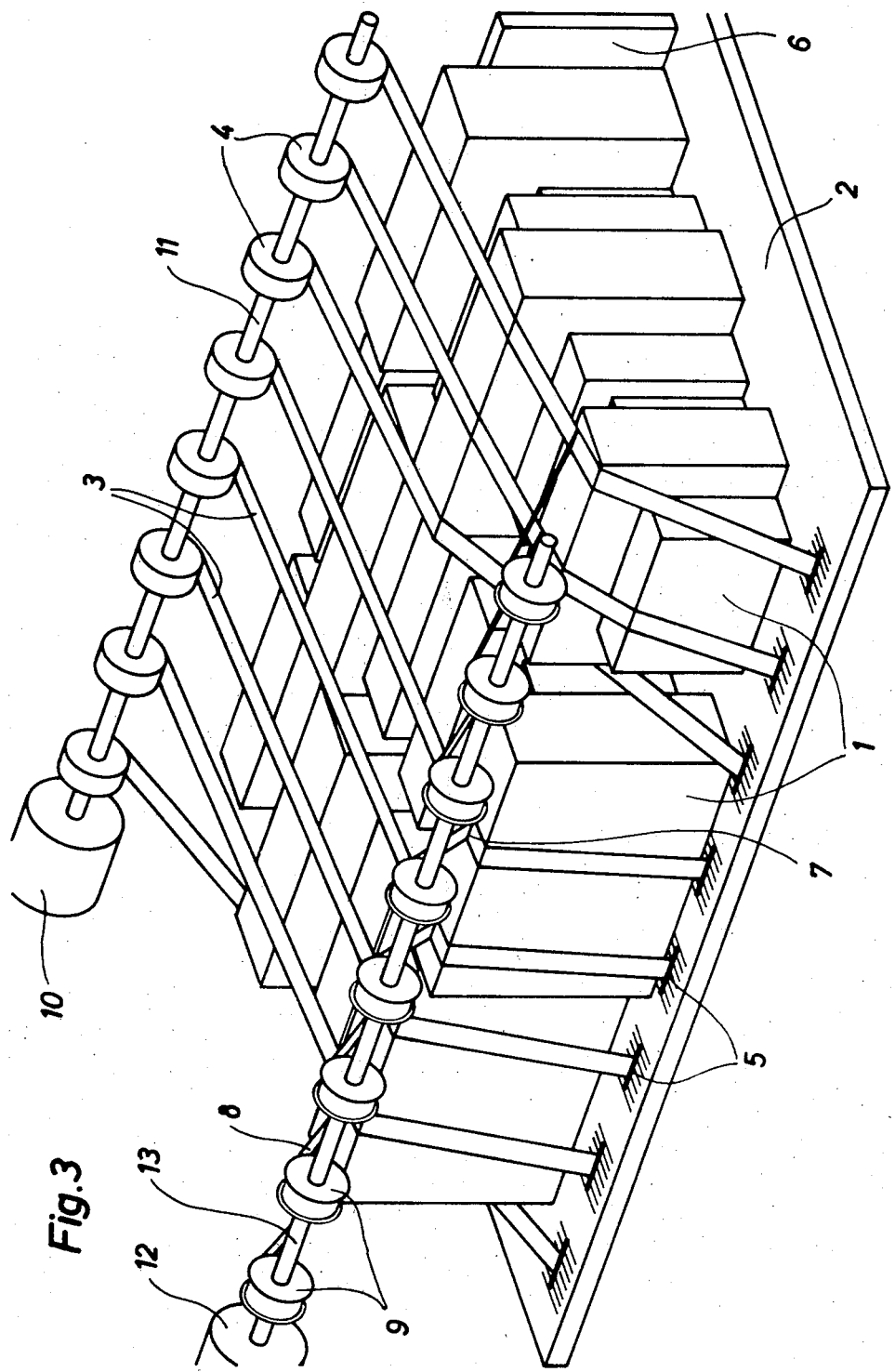
FIG. 3 is a perspective representation of a larger apparatus according to the invention shown in its lashed state.
Figure 4:
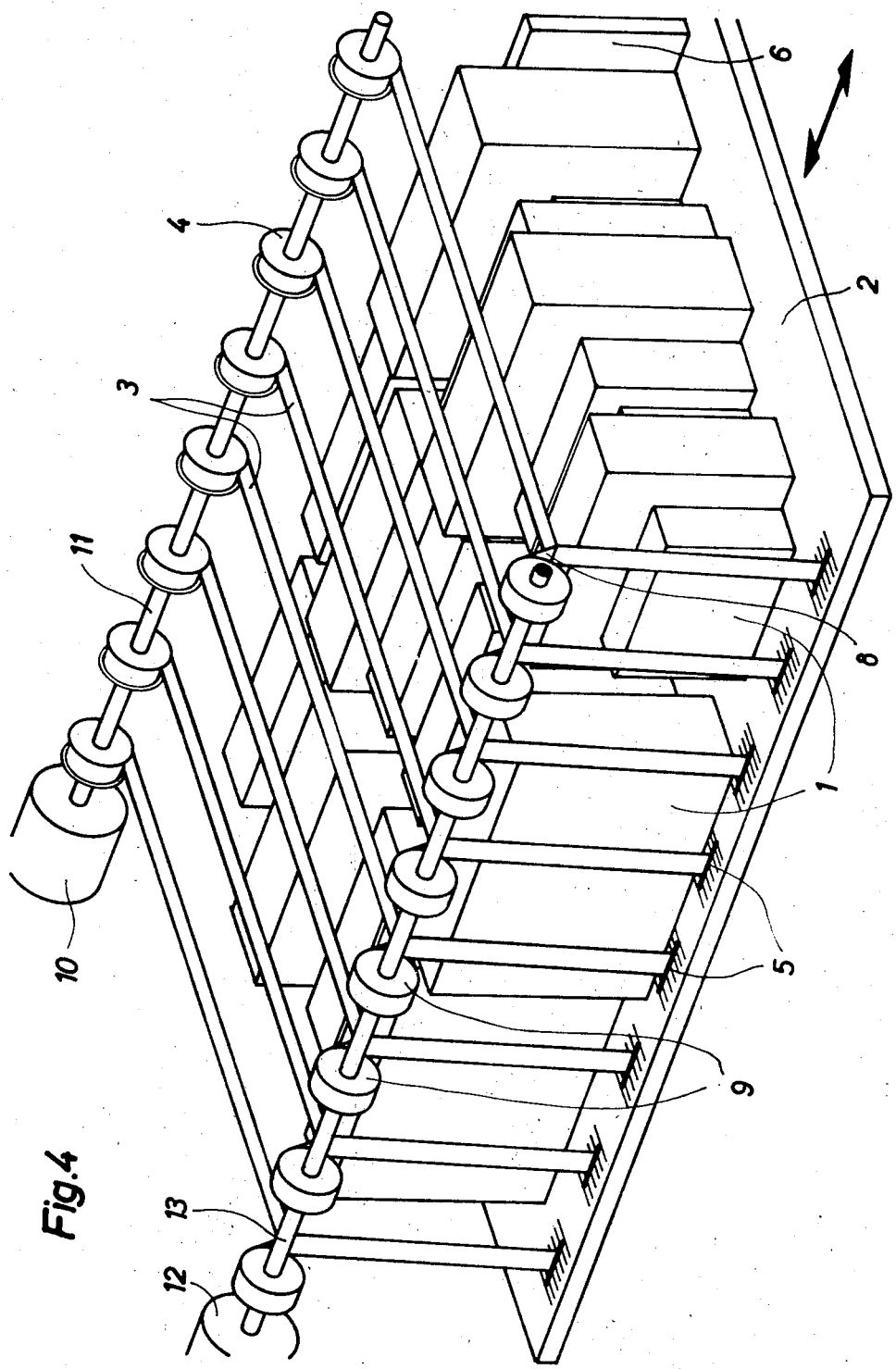
FIG. 4 shows the apparatus of FIG. 3 in its unlashed state.

In the embodiment shown in FIGS. 3 and 4, many upright bags or articles 1 rest on storage base 2. These articles may, for example, have been brought into this position by a conveying device which constitutes the storage base.

A number of tightening drums 4 are attached at approximately equal intervals on a tightening shaft 11 in such a way that tightening drums 4 are locked against turning clockwise as viewed in FIGS. 3 and 4, but that, upon restraining of the tightening drum by the tightening strap 3 coiled on it in a twist-tight manner and a counterclockwise turning torque of the shaft overcoming the resistance of a clutch built in between shaft and each tightening drum, the shaft turns counterclockwise. Shaft 11 is controllably driven by a motor 10.

During the operational stage leading to the state shown in FIG. 3, the tightening shaft 11 is turned counterclockwise to coil all tightening straps 3 onto the tightening drums 4. But, as these tightening straps do not pass over a uniform profile of the articles, they do not become taut simultaneously and, therefore, by their tension, restrain the tightening drums at different times while the clutches enable shaft 11 to continue turning. At the state shown in FIG. 3, all tightening straps 3 are tightly stretched and are pressing the bags or articles 1 against storage base 2 and support wall 6 so that articles are securely held. The resistive torque is preferably of an amount that, on the one hand, the articles are tightly lashed but, on the other, are not damaged or crushed.

Upon reaching the lashing condition shown in FIG. 3 where all tightening straps are taut, shaft 11 may be locked. It can be advantageous, however, to continue turning the shaft against the resistance of all clutches during the flight, for instance, and, thus, to maintain the tension of such tightening straps which might otherwise become slackened by a shift of cargo.

Lifting drums 9, also shown in FIGS. 3 and 4 and corresponding in number to that of tightening drums 4, are attached at approximately equal intervals on a lifting shaft 13 which can be controllably rotated by a motor 12. Prior to, or, at the latest, simultaneously with, the counterclockwise (as viewed in FIGS. 3 and 4) turning of the tightening shaft 11 as described above, all lifting drums 9 on their part have been turned clockwise sufficiently to relieve lifting straps 8 coiled on them. In the drawing, the uncoiled lengths of the lifting straps 8 are, for simplicity's sake, shown as being straight, whereas, in reality, they will more or less sag, corresponding to the profile of the articles. In order to prevent further and unnecessary sagging of the lifting straps, the shaft can now be locked.

FIG. 4 shows the apparatus in its slackened state. During the operational steps leading to this position, lifting drums 9 are rotated counterclockwise until they have tightened the relieved portions of tightening straps 3 between their anchorings 5 and their points of attachment 7 and have thus removed them from the bags. Thereupon, shaft 13 and, with it, drums 9 are locked. Prior to, or at latest, simultaneous with, the counterclockwise turning of lifting drums 9, tightening shaft 11 and tightening drums 4 which in this direction are locked to it are rotated clockwise. Thereby, all tightening strips 3 are sufficiently slackened through an approximately equal uncoiling to make possible the tightening of their portions between the places 5 and 7 as described above. But, as noted previously, tightening straps 3 are extended unequal lengths according to the particular profile of the articles over which they pass, and, therefore, the horizontal portions of the tightening straps are naturally sagging to a different extent, These unevenly sagging portions are tightened up to the required extent by counterclockwise rotation of shaft 11 and by means of the equalizing effect of the clutches until they are all lifted off sufficiently from the bags or articles. Thereupon, the shaft 11 is locked. The bags can now be freely moved in either direction as indicated by the double arrow in FIG. 2.

The described embodiment can, of course, be modified without departing from the basic concept of the invention. For instance, the lateral support wall could be omitted and the tightening rollers be arranged further down so that the articles would be pressed against the storage base only. In that case, it would be preferable to use two lifting straps—one each on opposite edges of the storage base—to each tightening strap with associated lifting drums in order to provide an adequately wide clear space beneath the tightening straps.

Those skilled in the art will appreciate that various other changes and modifications can be made in the preferred form of apparatus described herein without departing from the spirit and scope of the invention.

I claim:

1. Apparatus for the lashing down of articles to the cargo-bearing bed of a means of transport comprising at least one tightening strap and associated rotatable twist-tight drum, said strap extending above and at least partly laterally along the articles to be lashed down, one end of said tightening strap being attached to the means of transport and the other end being attached to its associated twist-tight drum for tightening retraction and loosening extension of said strap with respect to said articles, said tightening strap twist-tight drum being mounted for winding and unwinding rotation on the means of transport adjacent said other end of said tightening strap, and at least one lifting strap and associated rotatable twist-tight drum, one end of said strap being attached to said tightening strap at a point intermediate its ends and the other end being attached to its associated twist-tight drum for lifting retraction and lowering extension of said strap, said lifting strap twist-tight drum being mounted for winding and unwinding rotation on the means of transport, the rotation of said twist-tight drums being controllable so that the tightening retraction of said tightening strap is accompanied by a corresponding lowering extension of said lifting strap to lash down the articles and loosening extension of said lifting strap by a corresponding lifting of said tightening strap away from the articles.

2. The apparatus according to claim 1 in which said tightening strap in its loosened position extends generally horizontally above and vertically on one side of the articles at a distance therefrom together with a supporting structure abutting the articles on their other side.

3. The apparatus according to claim 1 together with a pair of independently drivable shafts, one of said shafts having mounted thereon and spaced along the shaft at regular intervals the twist-tight drums associated with all of said tightening straps, and the other of said shafts having mounted thereon and spaced along the shaft at regular intervals the twist-tight drums associated with all of said lifting straps.

4. Apparatus according to claim 3 in which a clutching means is provided between each drum associated with a tightening strap and the shaft upon which it is mounted whereby after each tightening strap has been retracted and reached a taut condition preventing further turning of its associated drum, its associated drum is locked against unwinding and slackening of said tightening strap and further turning in the tightening direction of the shaft carrying the tightening strap drums is permitted.

5. Apparatus according to claim 4 in which the shaft driving the tightening strap drums is provided with means holding it under a controllable tightening torque to maintain tension in all tightening straps even in the event of a shift of the lashed-down articles.

6. Apparatus according to claim 1 having a plurality of neighboring tightening straps interconnected by a network of cross straps.

7. Apparatus according to claim 1 in which at least part of said tightening straps comprises elastic material.

* * * * *